United States Patent
Kato et al.

(10) Patent No.: US 11,351,601 B2
(45) Date of Patent: Jun. 7, 2022

(54) COPPER ALLOY POWDER HAVING EXCELLENT LASER ABSORPTIVITY

(71) Applicant: MITSUBISHI MATERIALS CORPORATION, Tokyo (JP)

(72) Inventors: Jun Kato, Saitama (JP); Yuki Ito, Saitama (JP); Hiroyuki Matsukawa, Osaka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 16/975,355

(22) PCT Filed: Mar. 1, 2019

(86) PCT No.: PCT/JP2019/008150
§ 371 (c)(1),
(2) Date: Aug. 24, 2020

(87) PCT Pub. No.: WO2019/168166
PCT Pub. Date: Sep. 6, 2019

(65) Prior Publication Data
US 2020/0398337 A1  Dec. 24, 2020

(30) Foreign Application Priority Data
Mar. 1, 2018 (JP) .............. JP2018-036502

(51) Int. Cl.
*C22C 9/10* (2006.01)
*B33Y 70/00* (2020.01)
*B22F 1/05* (2022.01)

(52) U.S. Cl.
CPC ............ *B22F 1/05* (2022.01); *B33Y 70/00* (2014.12); *C22C 9/10* (2013.01); *B22F 2301/10* (2013.01)

(58) Field of Classification Search
None
See application file for complete search history.

(56) References Cited

U.S. PATENT DOCUMENTS

2016/0332227 A1  11/2016  Tsubota et al.
2017/0182557 A1  6/2017  Tsubota et al.

FOREIGN PATENT DOCUMENTS

CN  102912342 A  2/2013
CN  103361521 A  10/2013
CN  103726048 A  4/2014
(Continued)

OTHER PUBLICATIONS

Fedorchenko et al., "Tribotechnical Characteristics of Powder Composite Materials based on Copper in High-Speed Friction", Jul. 1986, Institute of Problems of Materials Science, Academy of Sciences of the Ukrainian SSR, No. 7 (283), pp. 52-56. (Year: 1986).*

(Continued)

*Primary Examiner* — Xiaobei Wang
(74) *Attorney, Agent, or Firm* — Leason Ellis LLP

(57) ABSTRACT

This copper alloy powder having an excellent laser absorptivity includes: either one or both of B and S in an amount of 0.003 mass % to 5.0 mass %, with a remainder being Cu and inevitable impurities, wherein an average particle diameter is 20 μm to 80 μm. This copper alloy powder having an excellent laser absorptivity is preferably a powder for metal additive manufacturing.

4 Claims, 2 Drawing Sheets

(56) References Cited

FOREIGN PATENT DOCUMENTS

| | | | |
|---|---|---|---|
| JP | 2005297052 | * | 10/2005 |
| JP | 2008-095169 A | | 4/2008 |
| JP | 2008095169 | * | 4/2008 |
| JP | 2014-005491 A | | 1/2014 |
| JP | 2014005491 A | * | 1/2014 |
| JP | 2016-211062 A | | 12/2016 |
| JP | 2017-141505 A | | 8/2017 |
| JP | 2019-108587 A | | 7/2019 |

OTHER PUBLICATIONS

Sheikhaliev et al., "Effect of the Physicochemical Properties of Metallic Melts on the Particle Size of Powders", Sep. 1989, Moscow Engineering and Physical Institute Branch 2, No. 9 (321), pp. 10-14. (Year: 1989).*
International Search Report dated May 21, 2019 for the corresponding PCT International Patent Application No. PCT/JP2019/008150.
Matthias et al. "Process development for the manufacturing of 99.94% pure copper via selective electron beam melting", Materials Letters, Dec. 29, 2014, pp. 298-301, vol. 143, XP029138502, ISSN: 0167-577X, DOI: 10.1016/J.MATLET.2014.12.105.
European Search Report dated Oct. 22, 2021 for the corresponding European Patent Application No. 19760856.5.
Japanese Office Action dated Jul. 6, 2021 for the corresponding Japanese Patent Application No. 2018-036502.
Chinese Office Action dated Dec. 1, 2021 for the corresponding Chinese Patent Application No. 201980012710.7.

* cited by examiner

COPPER ALLOY POWDER HAVING EXCELLENT LASER ABSORPTIVITY

CROSS-REFERENCE TO RELATED PATENT APPLICATIONS

This application is a U.S. National Phase Application under 35 U.S.C. § 371 of International Patent Application No. PCT/JP2019/008150 filed on Mar. 1, 2019 and claims the benefit of priority to Japanese Patent Application No. 2018-036502 filed on Mar. 1, 2018, all of which are incorporated herein by reference in their entirety. The International Application was published in Japanese on Sep. 6, 2019 as International Publication No. WO/2019/168166 under PCT Article 21(2).

FIELD OF THE INVENTION

The present invention relates to a copper alloy powder having an excellent laser absorptivity, which is suitable for use in additive manufacturing or the like.

BACKGROUND OF THE INVENTION

In recent years, metal additive manufacturing (AM) technologies have been developed, and in the metal additive manufacturing (AM) technologies, a metal powder is sintered or melted to be solidified through irradiation with laser light or electron beams; and thereby, a three-dimensional shaped object is manufactured.

Among the metal AM technologies, in a selective laser melting (SLM) method using laser, laser light having a near infrared wavelength, such as fiber laser, is used. Maraging steel, stainless steel (SUS), titanium (Ti), and the like, having a good laser absorptivity, have been mainly used as a metallic material to be applied.

However, there has also been a demand for employing not only maraging steel, stainless steel, and titanium, but also copper and aluminum having a low absorptivity of laser light having a near infrared wavelength as a powder particle material for the metal AM technologies.

Regarding copper and copper alloys, due to large energy diffusion by high thermal conductive properties, and a low absorptivity of laser light such as fiber laser or YAG laser in a near infrared wavelength region near 1,000 nm, copper and copper alloys are difficult to melt with laser, or have a problem of low efficiency even when being melted. For example, in a case where fiber laser having a wavelength of 1,064 nm is used, the laser absorptivity of copper is about 10%.

Therefore, for example, as described in Japanese Unexamined Patent Application, First Publication No. 2017-141505, a method has been proposed in which an oxide film or a black film is formed on the surface of a metal powder and the laser absorptivity is improved using these films. In the technology described in Japanese Unexamined Patent Application, First Publication No. 2017-141505, attempts have been made to improve heating efficiency using an oxide film or a black film formed on the surface of a copper powder by irradiating the copper powder with assisting beams having a different wavelength in addition to beams for shaping.

In addition, as described in Japanese Unexamined Patent Application, First Publication No. 2016-211062, a technology has been disclosed in which a copper alloy powder containing a predetermined amount of at least one of Cr and Si is prepared by an atomization method or the like, and the copper alloy powder is irradiated with laser to be subjected to melting and bonding, and thus an additive manufactured object having a high relative density is manufactured.

There is a strong demand for realizing additive manufacturing using a powder of copper or a copper alloy having a low laser absorptivity, and it is thought that it is necessary to devise a way to improve the laser absorptivity of the powder of copper or a copper alloy in a near infrared wavelength region.

However, the technology using a copper alloy powder described in Japanese Unexamined Patent Application, First Publication No. 2017-141505 has a problem that the oxygen concentration in the additive manufactured object increases due to the formation of the oxide film; and thereby, the thermal conductivity of the copper alloy powder decreases.

In addition, Japanese Unexamined Patent Application, First Publication No. 2016-211062 does not describe the influence of the addition of Cr or Si to the copper alloy powder on the laser absorptivity. Furthermore, there is a concern that the electric conductivity or the thermal conductivity of copper may be reduced in a case where Cr or Si is added, and there is a concern that heat exchange characteristics may be reduced in the application to a heat exchange member using additive manufacturing.

Problems to be Solved by the Invention

The present invention is contrived in view of the above-described problems, and an object thereof is to provide a copper alloy powder which is suitable for additive manufacturing or the like and has an improved laser absorptivity in a near infrared wavelength region.

SUMMARY OF THE INVENTION

Solutions for Solving the Problems (1) In order to achieve the above object, a copper alloy powder having an excellent laser absorptivity according to an aspect of the present invention includes: either one or both of B and S in an amount of 0.003 mass % to 5.0 mass %, with a remainder being Cu and inevitable impurities, wherein an average particle diameter is 20 µm to 80 µm.

(2) The copper alloy powder having an excellent laser absorptivity according to an aspect of the present invention is preferably a powder for metal additive manufacturing.

Effects of Invention

According to an aspect of the present invention, since a copper alloy powder contains B and S in an appropriate amount, it is possible to provide a copper alloy powder having a good laser absorptivity in a near infrared wavelength region and having good heat generation efficiency.

Accordingly, in a case where a copper alloy powder according to an aspect of the present invention is used, it is possible to provide a copper alloy powder which is effective in additive manufacturing by heat generation using laser light having a near infrared wavelength.

BRIEF DESCRIPTION OF THE DRAWINGS

FIG. 3 is a graph showing dependence of the laser absorptivity on the total amount of S and B of the copper alloy powders obtained in the examples and the comparative examples on.

DETAILED DESCRIPTION OF THE INVENTION

Figure 1:
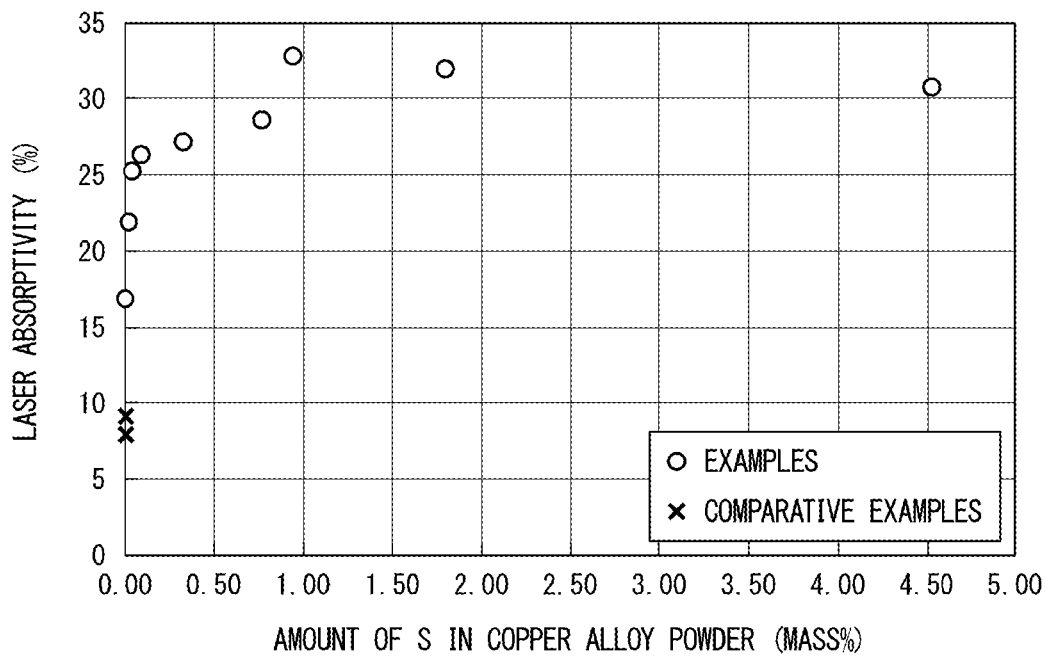
FIG. 1 is a graph showing dependence of the laser absorptivity on the amount of S of the copper alloy powders obtained in the examples and the comparative examples.

Hereinafter, the present invention will be described in detail, but the present invention is not limited to embodiments described below.

A copper alloy powder according to a first embodiment of the present invention contains one or two (either one or both) of boron (B) and sulfur (S) in an amount of 0.003 mass % to 5.0 mass % with a remainder being Cu (Cu) and inevitable impurities.

"Amount of B and Amount of S"

Regarding amounts of B and S of the copper alloy powder, either one or both of B and S are contained in an amount of 0.003 mass % to 5.0 mass %; and thereby, it is possible to provide a copper alloy powder which can obtain an excellent laser absorptivity of 15% or greater in a case where laser light in a near infrared wavelength region near 1,000 nm is used. In a case where the amount of the additive element is less than 0.003 mass %, a sufficient laser absorptivity cannot be obtained. In a case where the amount of the additive element is greater than 5.0 mass %, segregation or cracking occurs during melting and casting in the manufacturing of an ingot for manufacturing a copper alloy powder, and there is a problem that a uniform ingot cannot be produced. In a case where the additive element is not uniformly dispersed in the ingot for manufacturing a copper alloy powder, it is not possible to obtain a copper alloy powder having a target composition.

For example, in a case where S is contained in an amount of 0.003 mass % to 5.0 mass %, it is possible to obtain a laser absorptivity of 16% to 33%. In a case where B is contained in an amount of 0.003 mass % to 5.0 mass %, it is possible to obtain a laser absorptivity of 16% to 27%. The laser absorptivity of a pure copper powder is about 8.0%.

The amount of S in the copper alloy powder can be selected in a range of 0.005 mass % to 4.6 mass %, and in order to obtain a laser absorptivity of 20% or greater, the amount of S is preferably selected in a range of 0.02 mass % to 4.6 mass %. However, the laser absorptivity is hardly improved even in a case where S is contained in an amount of greater than 1 mass %. Accordingly, it is desirable that S is contained in an amount of about 0.02 mass % to 1.0 mass % in view of obtaining an excellent laser absorptivity compared with that of pure copper and in view of reducing the manufacturing cost.

The amount of B in the copper alloy powder can be selected in a range of 0.005 mass % to 4.7 mass % in the above-described range, and in order to obtain a laser absorptivity of 20% or greater, the amount of B is preferably selected in a range of 0.05 mass % to 4.7 mass %. However, the laser absorptivity is hardly improved even in a case where B is contained in an amount of greater than 1.0 mass %. Accordingly, it is more desirable that B is contained in an amount of about 0.05 mass % to 1.0 mass % in view of obtaining an excellent laser absorptivity compared with that of pure copper and in view of reducing the manufacturing cost.

Regarding an improvement in the laser absorptivity by defining the amounts of B and S as described above, it is thought that a solid solution or a compound containing B and Cu, or a solid solution or a compound containing S and Cu is formed in the matrix of the copper alloy, and the presence of the solid solution or the compound contributes to the improvement in the laser absorptivity.

Accordingly, it is thought that the addition of S and the addition of B to Cu have the same actions and effects that can coexist, and both S and B can be added to Cu to improve the laser absorptivity.

"Average Particle Diameter"

The average particle diameter (50% median diameter) of the copper alloy powder according to this embodiment can be selected in a range of 20 μm to 80 μm. In the above-described range, the average particle diameter is preferably selected in a range of 30 μm to 60 μm.

In a case where the average particle diameter of the copper alloy powder is less than 20 μm, there is a concern that the copper alloy powder particles may easily aggregate, and the fluidity of the powder may be reduced. In a case where the fluidity of the copper alloy powder is impaired, there is a concern that the supply of the copper alloy powder to the powder bed may be hindered in the additive manufacturing using an additive manufacturing machine. In a case where the average particle diameter of the copper alloy powder is greater than 80 μm, there is a concern that the thickness per layer in the powder bed formed during the additive manufacturing may be increased, and the shaping accuracy may be reduced. Accordingly, there is a concern that the copper alloy powder may not be suitable for metal additive manufacturing.

For example, the additive manufacturing using a metal powder is performed as follows. As described in Japanese Unexamined Patent Application, First Publication No. 2017-141505, a lifting table is provided inside a container for shaping, and a thin film layer of a metal powder is provided on the lifting table. Only a necessary portion of the thin film layer is irradiated with laser light to melt the metal powder, and a solidified thin film layer is obtained after solidification. A thin film layer consisting of a metal powder is formed again on the solidified thin film layer. This thin film layer is irradiated with laser light again to melt only a necessary portion, and a solidified thin film layer is formed. This operation is repeated to laminate the solidified thin film layers, and a three-dimensional shaped object is prepared.

Accordingly, it is necessary to rapidly heat and melt the metal powder of the portion to be irradiated when the thin film layer of the metal powder is irradiated with laser light. Therefore, in a case where the copper alloy powder having a high laser absorptivity described above is used, additive manufacturing can be performed by efficiently performing heating and melting, and the copper alloy powder is suitable for additive manufacturing.

(Inevitable Impurity Elements)

By reducing the concentration of the inevitable impurities, characteristics of the electric conductivity and the thermal conductivity are improved. In a case where the concentration of the inevitable impurities is reduced more than necessary, the manufacturing process becomes complicated and the manufacturing cost is greatly increased. Accordingly, in this embodiment, the total concentration of the inevitable impurities excluding gas components (C, N, O) is set to be in a range of 5 mass ppm to 50 mass ppm. The total concentration of the gas components (C, N, O) is set to be in a range of 10 mass ppm to 10,000 mass ppm.

In order to set the total concentration of the inevitable impurities excluding the gas components (C, N, O) to be in a range of 5 mass ppm to 50 mass ppm, and to set the total concentration of the gas components (C, N, O) to be in a range of 10 mass ppm to 10,000 mass ppm, high purity copper or oxygen-free copper (C10100, C10200) having a purity of 99 to 99.9999 mass % can be used as a raw material.

In order to securely suppress an increase in the manufacturing cost, the lower limit of the concentration of the inevitable impurities excluding the gas components (C, N, O) is preferably 10 mass ppm or greater, and more preferably 15 mass ppm or greater. In order to reliably improve the electric conductivity and the thermal conductivity, the upper limit of the concentration of the inevitable impurities excluding the gas components (C, N, O) is preferably 45 mass ppm or less, and more preferably 40 mass ppm or less.

In this embodiment, the inevitable impurities other than the gas components (C, N, O) include Fe, Ni, As, Ag, Sn, Sb, Pb, Bi, P, Li, Be, F, Na, Mg, Al, Si, Cl, K, Sc, Ti, V, Cr, Mn, Nb, Co, Zn, Ga, Ge, Br, Rb, Sr, Y, Zr, Mo, Ru, Pd, Cd, In, I, Cs, Ba, rare earth elements (excluding La and Ce), Hf, Ta, W, Re, Os, Ir, Pt, Au, Hg, Tl, Th, and U.

"Method of Manufacturing Copper Alloy Ingot"

In this embodiment, in a method of manufacturing a copper alloy ingot, for example, high purity copper having a purity of 99.99 mass % or greater and less than 99.9999 mass %, and a Cu—S or Cu—B base alloy are used as raw materials, and the mixing ratio of each raw material is adjusted so as to obtain a target composition. Regarding S or B, a base alloy of each element is prepared from S or B having a purity of 99.9 mass % or greater and pure copper having a purity of 99.9 mass %, and the composition is adjusted using the base alloy.

"Method of Manufacturing Copper Alloy Powder"

For example, a gas atomization method can be applied as a method of manufacturing copper alloy powder according to this embodiment. The gas atomization method is known as a method in which a molten copper alloy is dripped into a space at a high speed, and high pressure gas atomization is performed to obtain a copper alloy powder having a shape similar to a sphere.

In this embodiment, an example using the gas atomization method has been described, but as the method of manufacturing copper alloy powder, a water atomization method, a centrifugal atomization method, an inductively coupled plasma method, a plasma atomization method, or the like may be used to manufacture the copper alloy powder.

In order to adjust the fluidity of the obtained copper alloy powder and to separate the aggregated particles of the powder, it is desirable to perform a classification step such that the median diameter of the copper alloy powder is in a range of 20 μm to 80 μm.

In the classification step, a sieving method, gravity classification, centrifugal classification, or the like can be used.

"Determination of Laser Absorptivity"

Regarding the laser absorptivity of the copper alloy powder, in order to stably achieve heat generation and melting by absorption of laser light, the laser absorptivity at 1,064 nm is preferably 20% or greater, and more preferably 25% or greater.

The laser absorptivity of the copper alloy powder can be measured using, for example, an "ultraviolet-visible-near infrared spectrophotometer U-4100" manufactured by Hitachi High-Tech Science Corporation.

By comparison of the laser absorptivity at 1,064 nm, which is the wavelength of fiber laser that is widely used in laser type metal additive manufacturing machines, it is possible to evaluate an improvement in the characteristics of the laser absorptivity of the copper alloy powder.

The laser absorptivity can be calculated by absorptivity="1−total reflectivity" using the total reflectivity obtained by the measurement.

In addition, in the measurement of the laser absorptivity, in order to suppress the influence of the powder particle size on the laser absorptivity, the obtained copper alloy powder is processed into a compact having a diameter of about 30 mm and a height of about 5 mm; and thereby, a measurement sample is obtained. The compact is obtained by, for example, the following method. A copper alloy powder is subjected to pressure molding at about 500 MPa using a cylindrical mold having a diameter of 30 mm by a powder molding method.

"Particle Diameter"

In the measurement of the average particle diameter (median diameter: 50% particle diameter) of the copper alloy powder, for example, "MT3300EXII" manufactured by MicrotracBEL Corp. can be used, and the average particle diameter can be measured by a laser diffraction/scattering method.

"Fluidity"

The fluidity of the copper alloy powder is preferably 22 sec/50 g or less, and more preferably 20 sec/50 g or less in order to stably achieve the supply of the powder and the formation of a powder bed.

The fluidity of the copper alloy powder is measured by the following method. Based on JIS Z-2502, a time required until 50 g of a copper alloy powder is dropped from an orifice is measured, and the fluidity is evaluated by the time.

According to the above-described embodiments, it is possible to provide a copper alloy powder which is easily melted using laser due to a high laser absorptivity of laser such as fiber laser or YAG laser in a near infrared wavelength region near 1,000 nm.

Furthermore, in a case of a copper alloy powder having an average particle diameter of 20 to 80 μm as described above, the particle diameter is sufficiently small with respect to the layer thickness generally used in a general laser additive manufacturing machine, and thus the powder can be uniformly laminated, and additive manufacturing can be performed without shaping defects.

In addition, in a case of the above-described copper alloy powder, B and S are contained in a suitable amount; and thereby, a reduction in the electric conductivity can be minimized, easiness for additive manufacturing is obtained, and a balance can be achieved between the electric conductive properties and the thermal conductive properties.

Examples

Copper alloy ingots having various compositions shown in Table 1 were prepared. Using molten alloys obtained from these ingots, copper alloy powders having various compositions were manufactured by a gas atomization method. The obtained various copper alloy powders were classified such that the average particle diameter was in a range of 20 μm to 80 μm.

"Measurement of Alloy Elements"

The obtained copper alloy ingots having various compositions were subjected to the measurement of concentrations of alloy elements using a high-frequency inductively coupled plasma emission spectrometric analysis method and a gas component analysis method (NDIR, TCD). In addition, the copper alloy powders having various compositions obtained by the gas atomization method were subjected to the measurement of concentrations of alloy elements using a high-frequency inductively coupled plasma emission spectrometric analysis method and a gas component analysis method (NDIR, TCD).

"Measurement of Laser Absorptivity"

The laser absorptivity of a powder compact having each composition was measured using an "ultraviolet-visible-near infrared spectrophotometer U-4100" manufactured by Hitachi High-Tech Science Corporation.

The wavelength of the laser light was set to 1,064 nm, which was the wavelength of fiber laser that was widely used in laser type metal additive manufacturing machines.

The measured laser absorptivity was calculated by absorptivity="1−total reflectivity" using the total reflectivity obtained by the measurement.

"Average Particle Diameter (median diameter)" The average particle diameter (median diameter: 50% particle diameter) of the obtained copper alloy powder sample was measured by a laser diffraction/scattering method using "MT3300EXII" manufactured by MicrotracBEL Corp.

"Measurement of Electric Conductivity"

The copper alloy ingots having various compositions were rolled into a plate shape and cut into plate-shaped samples. The electric conductivity (% IACS) of each sample was measured by a four-terminal method based on JIS C2525.

"Fluidity"

Using the obtained various copper alloy powders after classification, the fluidity (sec/50 g) was measured based on JISZ 2502.

The measurement results are collectively shown in Tables 1, 2, and 3.

TABLE 1

| | Ingot | | | Copper Alloy Powder | | | |
| | Alloy Composition | | | Alloy Composition | | | |
| | Added Element | Amount of Added Element (mass %) | Possibility of Preparation | Electric Conductivity (% IACS) | Amount of Added Element (mass %) | Average Particle Diameter (μm) | Fluidity (sec/50 g) | Laser Absorptivity (%) |
|---|---|---|---|---|---|---|---|---|
| Example 1 | S | 0.005 | ○ | 98.2 | 0.011 | 32 | 25 | 16.8 |
| Example 2 | S | 0.020 | ○ | 97.9 | 0.020 | 55 | 18 | 21.9 |
| Example 3 | S | 0.048 | ○ | 97.6 | 0.045 | 47 | 22 | 25.2 |
| Example 4 | S | 0.099 | ○ | 97.5 | 0.092 | 47 | 24 | 26.3 |
| Example 5 | S | 0.33 | ○ | 97.1 | 0.30 | 53 | 18 | 27.1 |
| Example 6 | S | 0.78 | ○ | 96.6 | 0.78 | 30 | 18 | 28.6 |
| Example 7 | S | 0.95 | ○ | 94.6 | 0.94 | 51 | 18 | 32.7 |
| Example 8 | S | 1.80 | ○ | 92.4 | 1.84 | 36 | 20 | 31.9 |
| Example 9 | S | 4.53 | ○ | 91.9 | 4.44 | 55 | 20 | 30.7 |
| Comparative Example 1 | — | 0.000 | ○ | 98.6 | — | 32 | 24 | 8.0 |
| Comparative Example 2 | S | 0.001 | ○ | 98.5 | 0.005 | 42 | — | 9.1 |
| Comparative Example 3 | S | 5.26 | x | — | — | — | — | — |
| Comparative Example 4 | S | 0.048 | ○ | 97.6 | 0.045 | 12 | 36 | 25.2 |
| Comparative Example 5 | S | 0.048 | ○ | 97.6 | 0.045 | 90 | 21 | 24.7 |

* Comparative Example 5 was not suitable as a raw material for additive manufacturing due to a large particle diameter.

TABLE 2

| | Ingot | | | Copper Alloy Powder | | | |
| | Alloy Composition | | | Alloy Composition | | | |
| | Added Element | Amount of Added Element (mass %) | Possibility of Preparation | Electric Conductivity (% IACS) | Amount of Added Element (mass %) | Average Particle Diameter (μm) | Fluidity (sec/50 g) | Laser Absorptivity (%) |
|---|---|---|---|---|---|---|---|---|
| Example 10 | B | 0.005 | ○ | 97.5 | 0.011 | 46 | 22 | 16.9 |
| Example 11 | B | 0.021 | ○ | 96.5 | 0.021 | 33 | 25 | 18.0 |
| Example 12 | B | 0.049 | ○ | 96.2 | 0.050 | 41 | 19 | 20.0 |
| Example 13 | B | 0.10 | ○ | 98.1 | 0.10 | 36 | 22 | 22.2 |
| Example 14 | B | 0.30 | ○ | 97.2 | 0.30 | 37 | 19 | 26.3 |
| Example 15 | B | 0.80 | ○ | 94.8 | 0.78 | 32 | 22 | 25.8 |
| Example 16 | B | 1.04 | ○ | 93.7 | 1.05 | 40 | 21 | 25.9 |
| Example 17 | B | 2.00 | ○ | 89.1 | 2.00 | 40 | 23 | 25.9 |
| Example 18 | B | 4.65 | ○ | 86.5 | 4.67 | 60 | 22 | 26.7 |

TABLE 2-continued

|  | Ingot | | | | Copper Alloy Powder | | | |
|---|---|---|---|---|---|---|---|---|
|  | Alloy Composition | | | | Alloy Composition | | | |
|  | Added Element | Amount of Added Element (mass %) | Possibility of Preparation | Electric Conductivity (% IACS) | Amount of Added Element (mass %) | Average Particle Diameter (μm) | Fluidity (sec/50 g) | Laser Absorptivity (%) |
| Comparative Example 6 | — | 0.000 | ○ | 98.6 | 0.000 | 32 | 24 | 8.0 |
| Comparative Example 7 | B | 0.001 | ○ | 98.4 | 0.005 | 44 | 19 | 9.7 |
| Comparative Example 8 | B | 5.11 | x | — | — | — | — | — |
| Comparative Example 9 | B | 0.049 | ○ | 96.2 | 0.050 | 16 | 35 | 20.0 |

TABLE 3

|  | Ingot | | | | Copper Alloy Powder | | | | |
|---|---|---|---|---|---|---|---|---|---|
|  | Alloy Composition | | | | Alloy Composition | | Average | | |
|  | Amount of S (mass %) | Amount of B (mass %) | Possibility of Preparation | Electric Conductivity (% IACS) | Amount of S (mass %) | Amount of B (mass %) | Particle Diameter (μm) | Fluidity (sec/50 g) | Laser Absorptivity (%) |
| Example 19 | 0.003 | 0.002 | ○ | 97.6 | 0.003 | 0.003 | 46 | 25 | 18.9 |
| Example 20 | 0.048 | 0.044 | ○ | 97.9 | 0.046 | 0.044 | 40 | 23 | 23.5 |
| Example 21 | 0.11 | 0.10 | ○ | 97.2 | 0.11 | 0.10 | 49 | 19 | 25.3 |
| Example 22 | 0.49 | 0.52 | ○ | 94.1 | 0.51 | 0.50 | 42 | 20 | 31.5 |
| Example 23 | 1.10 | 1.10 | ○ | 90.5 | 1.16 | 1.09 | 50 | 19 | 31.5 |
| Comparative Example 10 | 0.001 | 0.001 | ○ | 99 | 0.001 | 0.001 | 40 | 19 | 8.5 |
| Comparative Example 11 | 3.0 | 3.0 | x | — | — | — | — | — | — |

The samples of Examples 1 to 9 and Comparative Examples 1 to 5 shown in Table 1 represent examples in which a powder of a Cu—S alloy containing S in Cu was manufactured.

The ingots of Examples 1 to 9 consisted of a copper alloy in which 0.005 to 4.53 mass % of S was included in Cu. It was possible to prepare the ingots of Examples 1 to 9 without problems. The ingot of Comparative Example 3 consisted of a copper alloy containing 5.26 mass % of S. When the ingot of Comparative Example 3 was rolled after casting, large cracks were generated by slight processing, and segregation was confirmed. Therefore, the evaluation was interrupted.

The ingots of Examples 1 to 9 had an electric conductivity of 91.9 to 98.2% IACS, and exhibited a good electric conductivity.

The copper alloy powders obtained from the ingots of Examples 1 to 9 exhibited an excellent laser absorptivity of 16.8% to 32.7%. In Examples 1 to 9, the average particle diameter was in a range of 30 to 55 μm, the fluidity was in a range of 18 to 25 sec/50 g, and good fluidity was exhibited.

In contrast to the examples, the sample of Comparative Example 1 was a copper ingot or a copper powder in which S was not added, and a low laser absorptivity of 8.0% was exhibited.

In the sample of Comparative Example 2, the amount of S was 0.001 mass %, and due to the low amount of S, a low laser absorptivity of 9.1% was exhibited.

In the sample of Comparative Example 4, the added amount of S was in a desirable range, and the electric conductivity and the laser absorptivity were excellent. However, since the average particle diameter was 12 μm and the particle diameter was too small, the fluidity value was too large.

Since the fluidity based on JISZ 2502 indicates a time required to flow a measurement target powder from the specified orifice, the fact that the fluidity value is large means that the powder has poor fluidity. It can be understood that the reason why the copper alloy powder having a fine diameter has poor fluidity is that the powder aggregates and forms aggregated particles having a large particle diameter; and as a result, the fluidity is impaired.

In the sample of Comparative Example 5, the added amount of S was in a desirable range, and the electric conductivity and the laser absorptivity were excellent. However, since the average particle diameter was 90 μm and the particle diameter was too large, the sample was not suitable as a raw material for additive manufacturing because it leads to a reduction in the filling density and a reduction in the accuracy of manufactured products.

FIG. 1 shows dependence of the laser absorptivity on the amount of S of the samples of Examples 1 to 9 and the samples of Comparative Examples 1 and 2 shown in Table 1.

From FIG. 1, it has been found that in a case where the amount of S with respect to Cu was selected to be 0.005 mass % or greater, an excellent laser absorptivity was obtained.

From the results described above, it has been found that a copper alloy powder containing 0.003 mass % to 5.0 mass % of S with a remainder being Cu and inevitable impurities exhibited an excellent electric conductivity and an excellent laser absorptivity. In this copper alloy powder, the fluidity was excellent in a case where the average particle diameter was in a range of 20 to 80 µm. Accordingly, it has been found that the copper alloy powders of Examples 1 to 9 were suitable for additive manufacturing.

The samples of Examples 10 to 18 and Comparative Examples 6 to 9 shown in Table 2 represent examples in which a powder of a Cu—B alloy containing B in Cu was manufactured.

The molten ingots of Examples 10 to 18 consisted of a copper alloy in which 0.005 to 4.65 mass % of B was included in Cu. It was possible to prepare the molten ingots of Examples 10 to 18 without segregation. The ingot of Comparative Example 8 consisted of a copper alloy containing 5.11 mass % of B. When the ingot of Comparative Example 8 was rolled after casting, large cracks were generated by slight processing, and segregation was confirmed. Therefore, the evaluation was interrupted.

The molten ingots of Examples 10 to 18 had an electric conductivity of 86.5 to 98.1% IACS, and exhibited a good electric conductivity.

The copper alloy powders obtained from the ingots of Examples 10 to 18 exhibited an excellent laser absorptivity of 16.9% to 26.7%. In Examples 10 to 18, the average particle diameter was in a range of 32 to 60 µm, the fluidity was in a range of 19 to 25 sec/50 g, and good fluidity was exhibited.

In contrast to the examples, the sample of Comparative Example 6 was a copper powder in which B was not added, and a low laser absorptivity of 8.0% was exhibited.

In the sample of Comparative Example 7, the amount of B was 0.001 mass %, and due to the low amount of B, a low laser absorptivity of 9.7% was exhibited.

In the sample of Comparative Example 9, the added amount of B was in a desirable range, and the electric conductivity and the laser absorptivity were excellent. However, since the average particle diameter was 16 µm and the particle diameter was too small, the fluidity value was too large. Since the fluidity indicates a time required to flow a measurement target powder from the specified orifice, the fact that the fluidity value is large means that the powder has poor fluidity.

Figure 2:
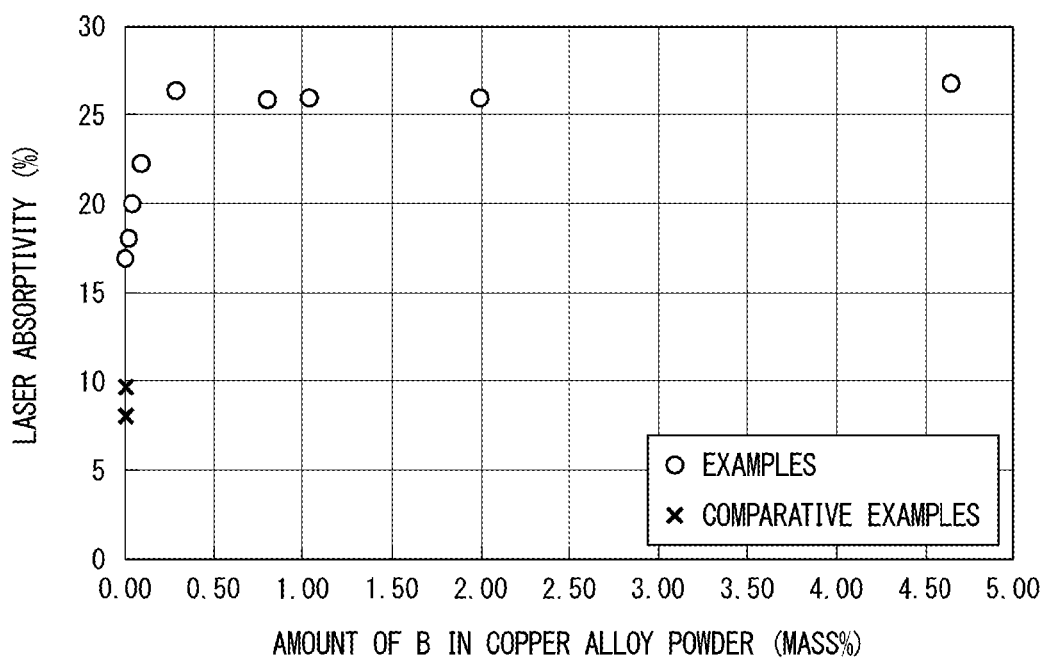
FIG. 2 is a graph showing dependence of the laser absorptivity on the amount of B of the copper alloy powders obtained in the examples and the comparative examples.

FIG. 2 shows dependence of the laser absorptivity on the amount of B of the samples of Examples 10 to 18 and the samples of Comparative Examples 6 and 7 shown in Table 2.

From FIG. 2, it has been found that in a case where the amount of B with respect to Cu was selected to be 0.005 mass % or greater, an excellent laser absorptivity was obtained.

From the results described above, it has been found that a copper alloy powder containing 0.003 mass % to 5.0 mass % of B with a remainder being Cu and inevitable impurities exhibited an excellent electric conductivity and an excellent laser absorptivity. In this copper alloy powder, the fluidity was excellent in a case where the average particle diameter was in a range of 20 to 80 µm. Accordingly, it has been found that the copper alloy powders of Examples 10 to 18 were suitable for additive manufacturing.

The samples of Examples 19 to 23 and Comparative Examples 10 and 11 shown in Table 3 represent examples in which a powder of a Cu—S—B alloy containing S and B in Cu was manufactured.

The molten ingots of Examples 19 to 23 consisted of a copper alloy in which 0.005 to 2.20 mass % of S and B were included in Cu. It was possible to prepare the molten ingots of Examples 19 to 23 without segregation. The ingot of Comparative Example 11 consisted of a copper alloy containing 3.0 mass % of S and 3.0 mass % of B. When the ingot of Comparative Example 11 was rolled after casting, large cracks were generated by slight processing, and segregation was confirmed. Therefore, the evaluation was interrupted.

The ingots of Examples 19 to 23 had an electric conductivity of 90.5 to 97.9% IACS, and exhibited a good electric conductivity. The ingots of Examples 19 to 23 exhibited an excellent laser absorptivity of 18.9% to 31.5%.

In the copper alloy powders obtained from the ingots of Examples 19 to 23, the average particle diameter was in a range of 40 to 50 µm, the fluidity was in a range of 19 to 25 sec/50 g, and good fluidity was exhibited.

In contrast to the examples, in the sample of Comparative Example 10, the amount of S was 0.001 mass % and the amount of B was 0.001 mass %, and these amounts were small. Accordingly, a low laser absorptivity of 8.5% was exhibited.

Figure 3:
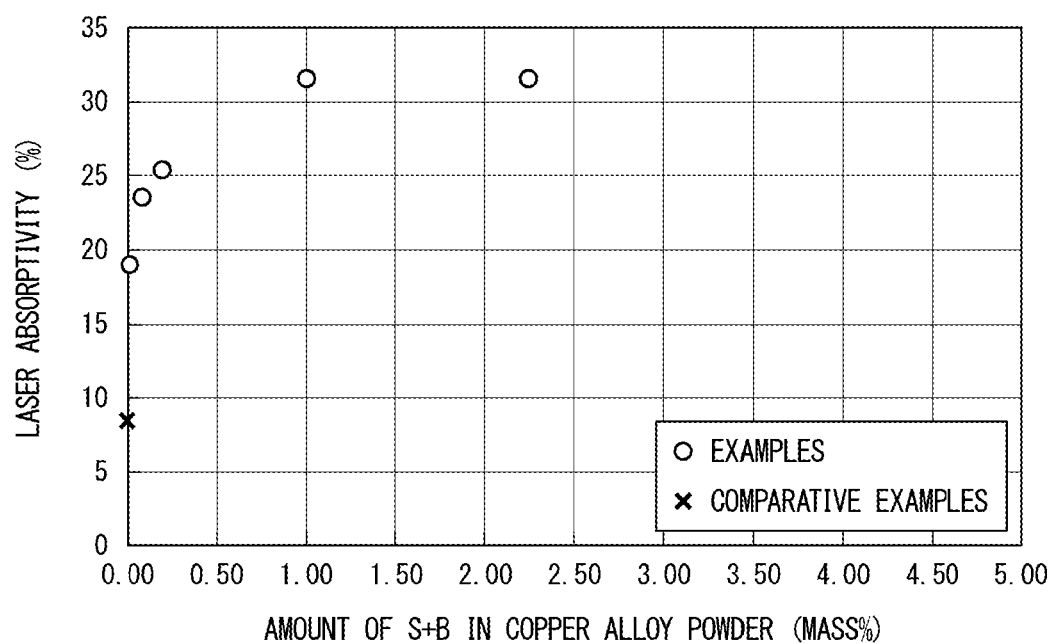

FIG. 3 shows dependence of the laser absorptivity on the total amount of S and B of the samples of Examples 19 to 23 and the sample of Comparative Example 10 shown in Table 3.

From FIG. 3, it has been found that in a case where the total amount of S and B with respect to Cu was selected to be 0.005 mass % or greater, an excellent laser absorptivity was obtained.

INDUSTRIAL APPLICABILITY

A copper alloy powder according to this embodiment has a good laser absorptivity in a near infrared wavelength region, and has good heat generation efficiency. Accordingly, the copper alloy powder according to this embodiment can be suitably applied to a step of generating heat by laser light having a near infrared wavelength to perform additive manufacturing.

What is claimed is:
1. A copper alloy powder having an excellent laser absorptivity, consisting of:
 S in an amount of 0.003 mass % to 5.0 mass %; and
 a remainder being Cu and inevitable impurities,
 wherein an average particle diameter is 20 µm to 80 µm.
2. The copper alloy powder having an excellent laser absorptivity according to claim 1,
 wherein the powder is a powder for metal additive manufacturing.
3. A copper alloy powder having an excellent laser absorptivity, consisting of:
 both B and S in an amount of 0.003 mass % to 5.0 mass % either individually or in total; and
 a remainder being Cu and inevitable impurities,
 wherein an average particle diameter is 20 µm to 80 µm.
4. The copper alloy powder having an excellent laser absorptivity according to claim 3,
 wherein the powder is a powder for metal additive manufacturing.

* * * * *